Dec. 17, 1957 D. J. CARLSON 2,817,064

SIGNAL COUPLING SYSTEM

Filed July 16, 1956 3 Sheets-Sheet 1

INVENTOR.

David J. Carlson

BY H. W. Newton

ATTORNEY

Dec. 17, 1957 D. J. CARLSON 2,817,064

SIGNAL COUPLING SYSTEM

Filed July 16, 1956 3 Sheets-Sheet 2

INVENTOR.
David J. Carlson
BY
H. C. Houston
ATTORNEY

INVENTOR.
David J. Carlson
BY
H. Newton
ATTORNEY.

United States Patent Office 2,817,064

Patented Dec. 17, 1957

2,817,064

SIGNAL COUPLING SYSTEM

David J. Carlson, Haddon Heights, N. J., assignor to Radio Corporation of America, a corporation of Delaware Application July 16, 1956, Serial No. 597,983

5 Claims. (Cl. 333—24)

This invention relates to coupling systems for ultra high frequency signal conveying circuits, and more particularly relates to low side reactive signal coupling systems for the tuning circuits of ultra high frequency (U. H. F.) receivers.

Two types of coupling systems which have heretofore been used to convey signals to or between receiver tuning circuits are known as low side capacitive and low side inductive coupling systems. In these systems the low signal potential sides of the circuits to be coupled are connected to ground for the system, through a common impedance means, such as an inductor or capacitor, and the coupling is effected by the circulating current in the common impedance means.

These coupling systems, while effective for certain applications, are not generally adaptable for use in wide-band U. H. F. circuits since the reactance of the coupling element changes with frequency, and therefore the coupling varies considerably over the frequency band. The problem of providing a simple and effective coupling system operable over a wide range of U. H. F. frequencies presents a difficult problem in the design of tuners, such as U. H. F. television tuners, which must be operable over the extremely wide range of signal frequencies extending from 470 megacycles to 890 megacycles, and in which the coupling must be carefully controlled to provide the proper bandwidth in all U. H. F. channels.

It is accordingly an object of the present invention to provide an improved and simplified wide-band coupling system for high frequency signal receiver circuits which is operable to convey signals to and between the high frequency circuits of the receiver without additional circuit components or complicated switching.

It is another object of this invention to provide an improved wide-band all-channel signal coupling system for the tuning circuits of a U. H. F. television tuner which is simple in construction, yet capable of providing controlled coupling to and between the tuning circuits of the tuner over the entire U. H. F. television band.

In accordance with the invention, the U. H. F. tuning system includes an element such as a tunable resonant transmission line supported adjacent a conductive ground plane member. The resonant transmission line and the ground plane member are mounted for rotation adjacent a conductive member such as a shield wall which is supported in a conductive chassis, the chassis being at signal ground potential for said system. The ground plane member is positioned closely adjacent the shield wall so that the capacitive reactance therebetween presents substantially a short circuit for U. H. F. signals from the ground plane member to the shield wall, thereby avoiding spurious signal paths. The low signal potential side of the U. H. F. tuning element is connected to the ground plane member, and the low side coupling reactance for the tuning element and a circuit to be coupled thereto comprises the effective inductance between the chassis and the effective point of contact of the U. H. F. tuning element with the conductive member.

The ground plane member is asymmetrically mounted with respect to its axis of rotation so that the effective point of contact of the ground plane member and the conductive member moves as the ground plane member is rotated. The ground plane member and shield member are positioned in the chassis so that as the effective point of contact moves, the signal current path length through the conductive member to the chassis is increased or decreased, thereby controlling the value of the common coupling inductance. Specifically, the path length is made maximum at the low frequency end of the U. H. F. tuning range and gradually decreases as the frequency is increased. Since the coupling impedance is directly proportioned to the product of the signal frequency and inductance, the effect of decreasing inductance as the signal frequency increases tends to maintain the coupling impedance substantially uniform. This feature affords a more uniform coupling to and between U. H. F. tuning circuits due to the more constant coupling impedance, thereby maintaining a constant bandwidth over the desired tuning range.

It is another object of this invention to provide an improved wide-band coupling system for U. H. F. tuning circuits which maintains substantially constant signal coupling between the circuits to be coupled over the U. H. F. frequency range.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 1 is a side elevational view of an all-channel U. H. F.-V. H. F. television tuner including a wide-band all-channel U. H. F. signal coupling system embodying the invention;

Figure 1:
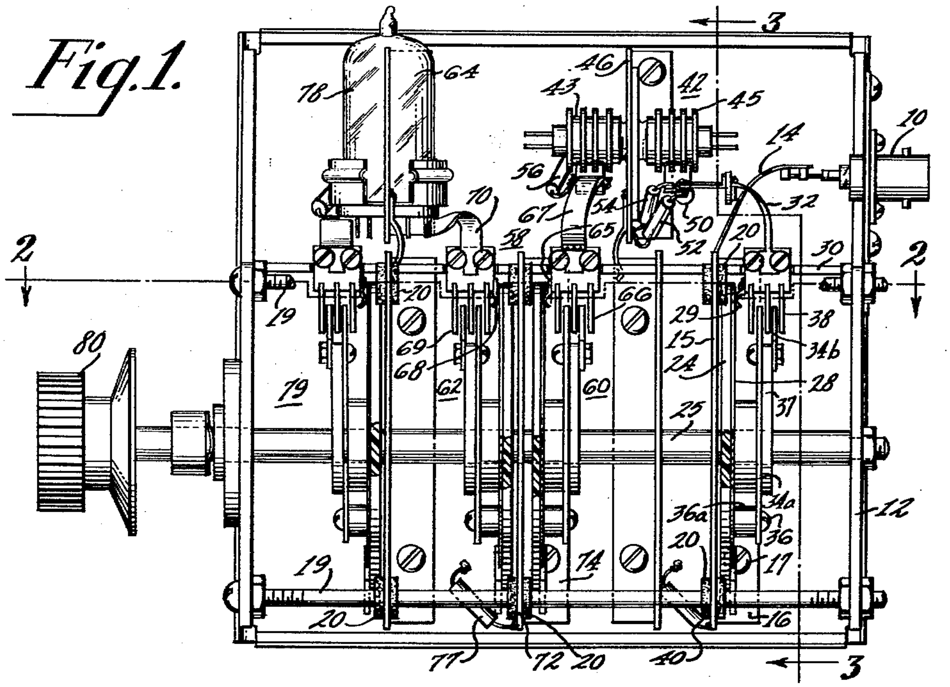
Figure 2:
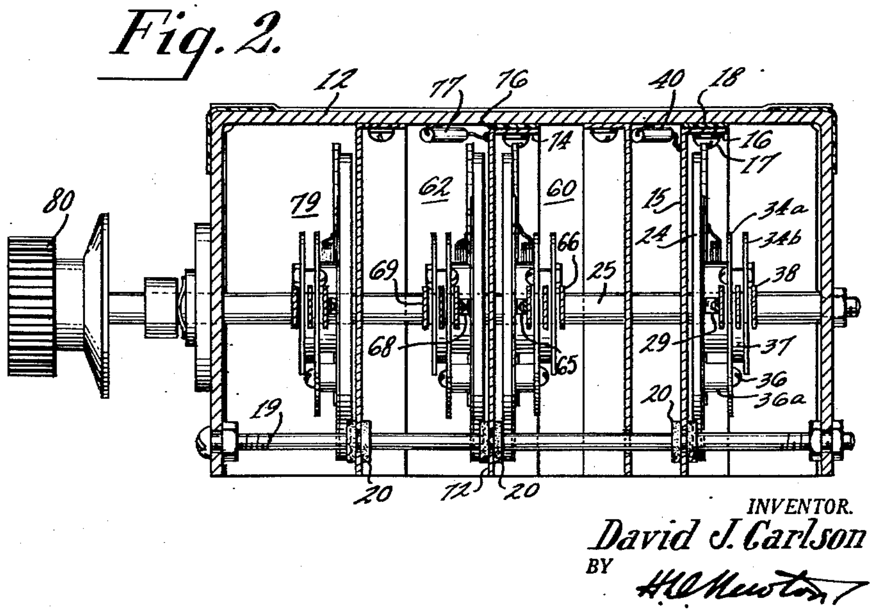
Figure 2 is a sectional view of the all-channel television tuner shown in Figure 1 taken on the section lines 2—2.
Figure 3:
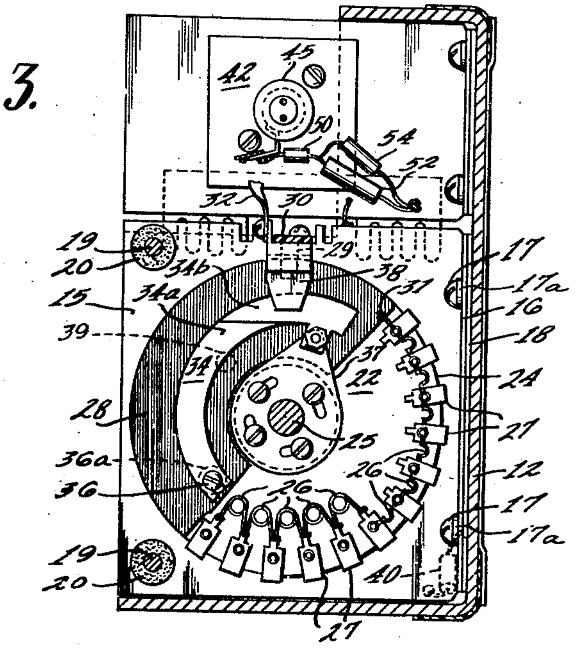
Figure 3 is a sectional view of the all-channel television tuner of Figure 1 taken on the section lines 3—3.
Figure 4:
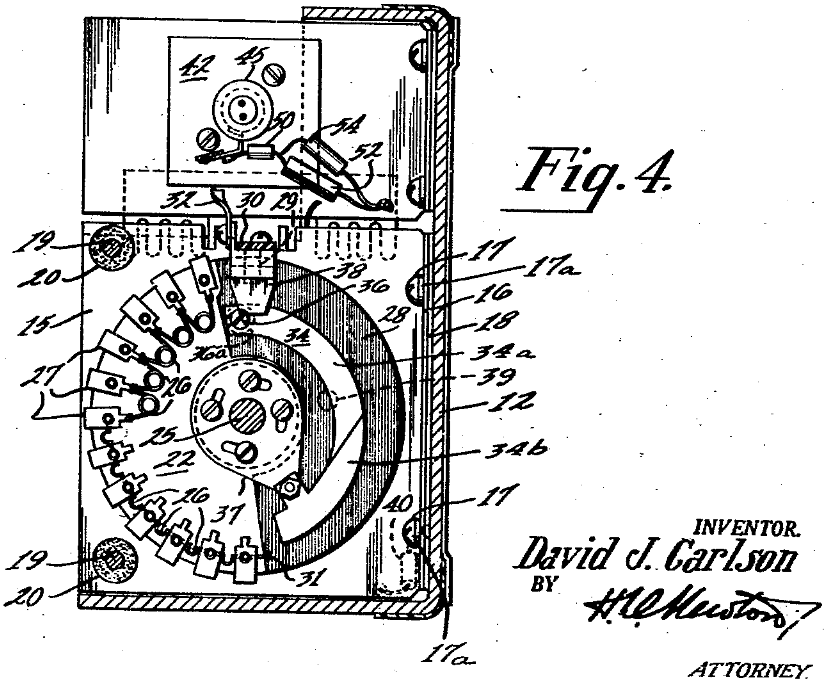
Figure 5:
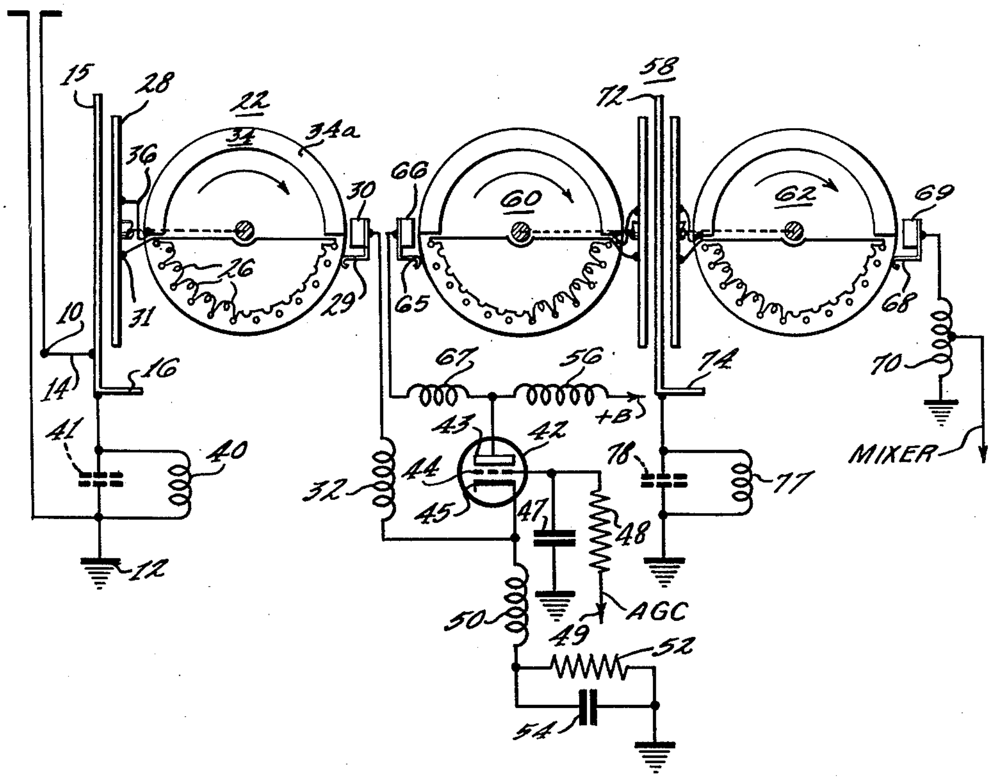

Figure 4 is a sectional view of the all-channel television tuner shown in Figure 1, taken on the section lines 3—3, but with the tuning circuits thereof rotated to a different channel selecting position; and Figure 5 is a schematic circuit diagram of a portion of the all-channel television tuner shown in Figures 1 to 4, which diagrammatically illustrates the tuning circuits and coupling system of the invention.

Reference is now made to the drawings in which like reference numerals are used throughout the various figures to designate similar components, and particularly to Figures 1 to 5 which show an all-channel television tuner operable to select any one of the 82 V. H. F. and U. H. F. television channels. The V. H. F. television channels 2 to 13 have been assigned two separate frequency ranges extending from 54 to 88 megacycles (mc.) for channels 2 to 6, and from 174 to 216 mc. for channels 7 to 13. The U. H. F. television band which includes channels 14 to 83 has been assigned the frequency range of 470 to 890 megacycles.

The all-channel television tuner includes tuning circuits for selecting any one of the 82 television channels, a radio frequency (R. F.) amplifier for amplifying the selected signal, and a mixer-oscillator circuit for converting the amplified signal to the corresponding intermediate frequency signal. The tuning circuits for the tuner include a signal selection circuit as a portion of the input circuit of the R. F. amplifier, and a double tuned circuit between the R. F. amplifier and the signal mixer stages. An additional tuning circuit is also provided for the local oscillator stages so that a heterodyning signal of the proper frequency is generated to convert the received signals to the receiver intermediate frequency.

Signals from a U. H. F-V. H. F. television antenna, not shown, are conveyed to an antenna input terminal 10, which is mounted on but insulated from a conductive chassis 12, the chassis being at reference potential or ground for the tuner. The antenna input terminal 10 is connected through a conductor 14 to a conductive shield member 15. The shield member 15, which forms one of the elements of the signal coupling system of the invention has a bent-over or flange portion 16 which is fastened to the chassis 12 by the screws 17. Insulating washers **17*a* are positioned under the screw heads so that no electrical connection is made through the screws 17 between the chassis 12 and the shield member 15. The shield member 15 is insulated from the chassis 12 by the insulating strip 18 which is positioned between the flange 16 and the chassis. The shield member 15 is further supported in the conductive chassis 12 by a pair of transverse rods 19 which are secured between the end walls of the chassis. The rods 19 are insulated from the shield member by suitable grommets 20**.

The tuning elements for the signal selection circuit 22 of the all-channel television tuner are mounted about the periphery of a rotatable disc 24 of insulating material. The disc 24 is affixed to a tuning control shaft 25 mounted for rotation between the end walls of the tuner chassis. As can best be seen in Figures 3 and 4, the tuning elements for the V. H. F. television channel frequencies which occupy about half the disc periphery include a plurality of inductors 26 which are connected between the twelve contact elements 27. The V. H. F. tuning elements are of conventional construction and include lumped inductors between the first six contact elements (corresponding to channels 2–7), and an arcuate conductor with portions of reduced width between the remaining contact elements. The arcuate conductor provides the necessary inductance for tuning the signal selection circuit 22 to the frequency of channels 8 to 13.

One end 31 of the series connected inductors 26 is connected to a conductive ground plane means 28 which is formed on, and covers about one-half of the area of the disc 24. The ground plane means 28, which also extends to the opposite side of the disc 24, is positioned closely adjacent the shield member 15, and the resulting capacitance between the shield member 15 and the ground plane means 28 is sufficient to provide a low impedance path for V. H. F. signals to the shield member 15.

A V. H. F. tuning circuit contactor 29 is mounted on an insulating support member 30. The contactor 29 is positioned to conductively engage successive ones of the contact elements 27 as the disc 24 is rotated about its axis. When the V. H. F. contactor 29 engages the contact element 31 which is connected to the ground plane means 28, the signal selection circuit is tuned to the frequency of television channel 13. As the disc 24 is then rotated in a counter-clockwise direction to the other V. H. F. contact terminals, additional inductors are successively connected in circuit between the contactor 29 and the ground plane means 28, until at the channel 2 position, all of the series inductors 26 are in connection between the V. H. F. contactor 29 and the ground plane means 28. The V. H. F. contactor 29 is connected to the cathode of an R. F. amplifier 42 through an inductor 32.

The tuning element for the U. H. F. channels comprises a quarter wave resonant transmission line 34 which includes an arcuate conductor **34*a* positioned in spaced relation above the conductive ground plane means 28. One end of the conductor 34*a* is conductively connected to the ground plane means through a supporting screw 36 and the associated spacer 36*a*. The other end of the conductor is supported by an insulating arm 37 which is mounted on the shaft 25 for rotation with the disc 24. The conductive ground plane provides a low impedance path to the shield member 15** for U. H. F. signal frequencies, and enables a higher Q for the tuned circuit by avoiding erratic contact resistance in the usual wiping contact.

A U. H. F. capacitive contact member 38 is mounted on the insulating support 30 adjacent the V. H. F. contactor 29. This contact member may be conductive or capacitive, and, if desired, the V. H. F. contactor and U. H. F. contact member may comprise a single element. As can be best seen in Figures 1 and 2, the capacitive contact member 38, as provided in the present example, has three parallel plates, two of which are positioned to mesh with the conductor **34*a* as the disc 24 is rotated. The tunable resonant transmission line 34 also has an additional conductor 34*b* which is spaced from but conductively connected to the open circuit end of the arcuate conductor 34*a*. The conductor 34*b* serves to provide additional capacitance between the transmission line 34 and the capacitive contact member 38 near the low frequency end of the V. H. F. tuning range, and enables a more uniform change in frequency with rotational movement of the disc 24**.

The frequency of resonance of the tunable transmission line 34 is controlled by the angular position of the disc 24 and is determined by the length of the conductor **34*a* between the capacitive contact 38 and the screw 36 which connects the conductor 34*a* to the ground plane means 28. As shown in Figure 3, most of the length of the conductor 34*a* is in circuit between the capacitive contact 38 and the ground plane means 28, and the transmission line is tuned to a frequency near the low end of the U. H. F. band corresponding to about the television channel 20. As shown in Figure 4, only a small portion of the length of the conductor 34*a* is in circuit between the ground plane means 28 and the U. H. F. contact 38, and the transmission line is tuned near the high end of the U. H. F. band, or to about channel 83. The U. H. F. capacitive contact member 38 is directly connected to the V. H. F. contactor, and both are connected to a grounded-grid R. F. amplifier through the inductor 32**, as mentioned above.

In the operation of the coupling circuit, signals from the input terminal 10 are conveyed to the signal selection circuit 22 through an all-channel low-side capacity and inductance coupling system. The all-channel coupling system includes an inductor 40 connected between the shield member 15 and the chassis 12, which is at ground potential for the tuner. The inductor 40 is selected to parallel resonate with the capacitance between the shield member and the chassis, at a frequency between the two V. H. F. television frequency ranges. The capacitance between the shield member 15 and the chassis is primarily a function of the size of the portion, such as flange portion 16, which is positioned closely adjacent and parallel to the chassis 12. However, supplemental and separate capacitor means may be connected from the shield to the chassis where necessary.

As can best be seen from Figure 5, the low signal potential side of both the V. H. F. and U. H. F. tuning elements are connected to the ground plane means 28, which, as mentioned above, is closely capacitively coupled to the shield member 15, and may be considered as directly connected to the shield member 15 for signals in the V. H. F. and U. H. F. television bands. The low signal potential side of these tuning circuits are completed to ground through the shield member 15 and the parallel resonant circuit including the inductor 40 and the shield-to-ground capacitance 41. Parallel resonant circuits appear inductive below the frequency of resonance, and capacitive above the frequency of resonance. Thus, for signals in the lower V. H. F. television range, channels (2–6), the parallel resonant circuit appears inductive, Since the antenna input terminal 10 is connected to the shield member 15, the antenna circuit is also completed to ground through the shield member 15 and the parallel resonant circuit, and the coupling between the antenna and signal selection circuits for the lower V. H. F. television range is effected by the circulating current in the common effective reactance of the parallel resonant circuit.

For signals in the upper V. H. F. television range, the parallel resonant circuit appears capacitive and the coupling from the antenna circuit to the signal selection circuit 22 is effected for these signals by the circulating current in the common effective capacitance of the parallel resonant circuit. The effective capacitance in series with the signal selection circuit has the desirable effect of permitting a larger inductance value to be used for the upper V. H. F. television band tuning circuit.

The ground plane means 28 has a semi-circular configuration, and covers about one half of the surface of the rotatable disc 24. Also, as mentioned above, the ground plane may be extended to the side of the disc 24 adjacent the shield wall 15 in order to obtain a closer capacitive coupling between the ground plane and the shield wall. The ground plane area adjacent the shield wall is also semi-circular in configuration, and is positioned directly opposite the area adjacent the resonant transmission line section 34.

As can be seen in Figures 3 and 4, the configuration of the ground plane means 28 is not symmetrical with respect to its axis of rotation, and therefore, the effective contact point of the U. H. F. tuning element to the shield wall will change as the ground plane means 28 is rotated. The effective point of contact 39 of the ground plane means 28 and the shield wall 15 may be considered as being at approximately the geometric center of the ground plane means. At the channel 20 position as shown in Figure 3, the effective contact point 39 is to the left of the tuning control shaft 25, and the U. H. F. signal current may be considered to flow from this point toward the connection of the shield wall 15 with the chassis 12 adjacent the flange 16. As the U. H. F. tuner is tuned to higher channel frequencies, the ground plane means is rotated in a clockwise direction, and the effective point of contact 39 moves closer to the flange 16, thereby reducing the length of the signal current path and the inductance. As shown in Figure 4, the U. H. F. tuner is tuned to channel 83, and the effective point of contact is to the right of the control shaft 25 and relatively close to the flange 16. In the channel 83 position, the signal current path length is shortest thereby presenting a minimum inductance.

Thus the signal path length or inductance, through the shield, is maximum at the low frequency end of the U. H. F. television band and gradually decreases as the frequency is increased. Since the impedance of the coupling circuit is directly proportional to the product of the signal frequency and the inductance, the effect of decreasing inductance as the signal frequency increases, tends to maintain the coupling circuit impedance constant. This feature affords a more uniform coupling between the antenna circuit and the signal selection circuit over the U. H. F. band due to the more constant common coupling impedance which in turn serves to maintain constant the band pass characteristic of the circuit.

The coupling system of the invention is operable to provide optimum coupling of U. H. F. television signals from the antenna input circuit to the signal selection circuit without the requirement of complicated circuitry or switching. For the lower range of frequencies in the V. H. F. television band, the system operates as a low-side inductance coupling circuit, and for the higher range of V. H. F. television signals, the system operates as a low-side capacity coupling circuit. If other forms of coupling circuits are provided for the V. H. F. circuits, the flange 16 may be connected directly to the chassis 12 thereby eliminating the insulating spacer 18.

The signal selection circuit 22 is connected to a wide band R. F. amplifier 42 which is operable to efficiently amplify signals in the V. H. F. and U. H. F. television bands. The R. F. amplifier 42 shown in the drawings is a pencil triode and has an anode 43, a control grid 44 (Fig. 5), and a cathode 45. The amplifier is connected for cathode-input grounded-grid operation, and to this end the signal selection circuit 22 is connected to the cathode 45 and the grid 44 is grounded for signal frequencies through a signal bypass capacitor 47. As is best shown in Figure 1 of the drawings, the R. F. amplifier 42 is mounted in a shield wall 46. The anode 43 and the cathode 45 which are of cylindrical configuration and have annular cooling fins, extend from opposite sides of the shield wall 46. The control grid 45 is physically positioned in the plane of the shield wall 46 between the anode 43 and cathode 45, but is insulated from the shield wall by a mica insulator which forms the dielectric of the capacitor 47 (Fig. 5). A resistor 48 connects the grid 45 to an automatic gain control (AGC) terminal 49.

A direct current path from the cathode 45 to ground is provided through the R. F. choke coil 50 and the cathode biasing resistor 52. A signal bypass capacitor 54 is connected in parallel with the resistor 52 to prevent degenerative feedback at signal frequencies in the amplifier circuit. The anode 43 is connected through an R. F. choke coil 56 to a source of operating potential +B.

A double tuned circuit 58, having first and second tunable sections 60 and 62, is connected between the R. F. amplifier 42 and a signal mixer stage 64. The first tunable section 60 of the double tuned circuit 58 provides the signal output circuit for the R. F. amplifier 42, and the second tunable section 62 provides the signal input circuit for the mixer 64. Both the first and second tunable sections 60 and 62 are tunable to any one of the eighty-two V. H. F.-U. H. F. television channels, and are identical in construction to the signal selection circuit 22. A V. H. F. tuning circuit contactor 65 and a U. H. F. capacity contact 66 for the first tunable section 60, which are substantially identical to the contacts 29 and 38 of the signal selection circuit are connected to the R. F. amplifier anode 43 through the inductor 67 which is shown in Figure 1 as a short conductive strap. A similar V. H. F. contactor 68 and U. H. F. capacitive contact 69 for the second tunable section 62 are connected to the signal mixer 64 through a tapped inductor 70. Signal coupling is effected between the first and second tunable sections of the double tuned circuit 58, by means of the all-channel coupling circuit of the invention. The first and second tunable sections 60 and 62, respectively, are mounted for rotation with the shaft 25 on opposite sides of a shield member 72. The shield member 72 is similar to the shield member 15, and has a bent over, or flange portion, 74 which is positioned adjacent the tuner chassis 12, but is insulated therefrom by an insulating strip 76. A tuning inductor 77 resonates with the capacity 78 presented between the shield member 72 and the chassis 12 at a frequency between the upper and lower V. H. F. television bands.

The coupling system of the invention operates in exactly the same manner as described above in connection with the antenna and signal selection circuits to couple signals from the first section 60 of the double tuned circuit 58, to the second section 62.

The signal mixer stage, not shown in Figure 5, is physically incorporated in the same envelope as the local oscillator stage 78. A separate tuning section 79, also mounted for rotation with the shaft 25, is provided for tuning the oscillator to the proper local oscillator signal frequency. The oscillator tuning circuit 79, not shown in Figure 5, is similar in construction to the signal selection and double tuned circuits, except that it is designed to be tunable to any of the V. H. F. or U. H. F. channel frequencies plus or minus the frequency of the television receiver I. F. which is ordinarily about 40 mc. Thus the selected and amplified television signals are combined with the local oscillator signals in the mixer stage 64 to provide a difference or I. F. signal for utilization in the receiver. A control knob 80 is provided on the free end of the shaft 25 to control the tuning of the all-channel tuner. Since the signal selection circuit 22, the double tuned circuit 58 and the oscillator tuning circuit 79 are all mounted on the shaft 25, these circuits are tuned simultaneously by rotation of the control knob 80.

It can be seen, therefore, that in accordance with the invention, an improved wide band ultra high frequency signal coupling system may be provided which is simple in construction yet capable of providing controlled and substantially constant coupling to and between tuning circuits which are tunable in a wide range of ultra high frequencies.

What is claimed is:

1. A wide-band signal coupling system for ultra high frequency tuning circuits comprising the combination of, a conductive chassis providing signal ground for the system, a conductive shield member supported in said chassis, means providing a low impedance connection for ultra high frequency signals between said shield member and said chassis, an ultra high frequency tuning circuit responsive to signals in an ultra high frequency range including a conductive ground plane member, said ground plane member being positioned closely adjacent and parallel to said shield member to provide a low impedance ultra high frequency signal current path through an effective area of contact between said ground plane member and said shield member, means for rotating said ground plane member conjointly with tuning operation thereof, said ground plane member being asymmetrically positioned with respect to the axis of rotation to change the position of the effective area of contact between said ground plane member and said shield member as said ground plane member is rotated whereby the mean effective distance through said shield member from said ground plane member to said chassis is substantially maximum near the lower end of the ultra high frequency range and substantially minimum near the upper end of said ultra high frequency range, a signal circuit to be coupled to said ultra high frequency tuning circuit, and means providing an ultra high frequency signal connection from the low signal potential side of said signal circuit to said conductive shield member at a point removed from the connection between said shield member and said chassis to provide coupling between the tuning circuit and the signal circuit through the common reactance of said shield member.

2. A wide-band signal coupling system for ultra high frequency tuning circuits operable over a wide range ultra high frequencies comprising the combination of, a conductive chassis providing signal ground for the system, a conductive shield member supported in said chassis, means providing a low impedance connection for ultra high frequency signals between said shield member and said chassis, a conductive ground plane member positioned closely adjacent and parallel to said shield member to provide a low impedance capacitive path for ultra high frequency signals between said ground plane member and said shield member, means for rotating said ground plane member, said ground plane member being asymmetrically mounted with respect to the axis of rotation to change the position of the low impedance capacitive path between said ground plane member and said shield member to provide a maximum path length for ultra high frequency signal current through said shield member to said chassis near the lower end of the ultra high frequency range, and a minimum path length for ultra high frequency signal current through said shield member to said chassis near the upper end of said ultra high frequency range, a tuning circuit and a signal circuit for said system, and means providing an ultra high frequency signal connection from the low signal potential side of said tuning circuit to said ground plane member, and means providing ultra high frequency signal connections from the low signal potential side of said signal circuit to said conductive shield member at a point removed from the connection between said shield member and said chassis to provide coupling between the tuning circuit and the signal circuit through the common reactance of said shield member.

3. A signal coupling system for the tuning circuits of a U. H. F. television tuner comprising the combination of, conductive chassis means at signal ground potential for the U. H. F. television tuner, a conductive shield member supported in said conductive chassis, means providing a low impedance path to U. H. F. television signals between said shield member and said chassis, means providing a U. H. F. tuning circuit including a rotatable conductive ground plane member positioned closely adjacent and parallel to said shield member to provide a low impedance capacitive path for U. H. F. television signals from said ground plane member to said shield member, said ground plane member being asymmetrically mounted with respect to its axis of rotation whereby the effective signal current path length of U. H. F. signal current through said shield member to said chassis changes as said ground plane is rotated, and means connecting a second signal circuit to said shield member at a point removed from the low impedance path between said shield member and said chassis whereby coupling is effected between said second circuit and said U. H. F. tuning circuit in the common current path in said shield member.

4. A signal coupling system for the tuning circuits of a U. H. F. television tuner comprising the combination of, conductive chassis means at signal ground potential for the U. H. F. television tuner, a conductive shield member supported in said conductive chassis, means providing a low impedance path to U. H. F. television signals between said shield member and said chassis, means providing a U. H. F. tuning circuit including a rotatable ground plane member positioned closely adjacent and parallel to said shield member to provide a low impedance capacitive path to U. H. F. television signals from said ground plane member to said shield member, said ground plane member being asymmetrically mounted with respect to its axis of rotation whereby the effective distance through said shield member to said chassis at the location of said low impedance path between said shield member and said chassis changes as said ground plane is rotated, and means connecting a second circuit to said shield member at a point removed from the low impedance path between said shield member and said chassis.

5. A signal coupling system for the tuning circuits of a U. H. F. television tuner comprising the combination of, means providing a U. H. F. tuning circuit including a rotatable conductive ground plane member, a planar conductive shield member positioned closely adjacent and parallel to said ground plane member to provide a low capacitive impedance path to U. H. F. television signals from said ground plane member to said shield member, conductive chassis means at signal ground potential for the U. H. F. television tuner for supporting said shield member and said ground plane member, means providing a low impedance path to U. H. F. television signals between said shield member and said chassis, said ground plane member being asymmetrically mounted with respect to its axis of rotation whereby the mean effective signal current path length of U. H. F. signal current through said shield member to said chassis changes as said ground plane is rotated, and means connecting a second circuit to said shield member at a point removed from the low impedance path between said shield member and said chassis whereby coupling is effected between said second circuit and said U. H. F. tuning circuit in the common current path in said shield member.

No references cited.